(12) United States Patent
Jibiki et al.

(10) Patent No.: US 10,983,289 B2
(45) Date of Patent: Apr. 20, 2021

(54) OPTICAL CONNECTOR

(71) Applicant: SEIKOH GIKEN Co., Ltd., Matsudo (JP)

(72) Inventors: Masayuki Jibiki, Matsudo (JP);
Yoshihisa Kurakami, Matsudo (JP);
Junji Taira, Matsudo (JP)

(73) Assignee: SEIKOH GIKEN Co., Ltd., Matsudo (JP)

(*) Notice: Subject to any disclaimer, the term of this patent is extended or adjusted under 35 U.S.C. 154(b) by 0 days.

(21) Appl. No.: 16/796,946

(22) Filed: Feb. 21, 2020

(65) Prior Publication Data

US 2020/0271870 A1    Aug. 27, 2020

Related U.S. Application Data

(60) Provisional application No. 62/810,965, filed on Feb. 27, 2019.

(51) Int. Cl.
  *G02B 6/38* (2006.01)
  *G02B 6/44* (2006.01)

(52) U.S. Cl.
  CPC ......... *G02B 6/3887* (2013.01); *G02B 6/3833* (2013.01); *G02B 6/3898* (2013.01); *G02B 6/4477* (2013.01)

(58) Field of Classification Search
  None
  See application file for complete search history.

(56) References Cited

U.S. PATENT DOCUMENTS 8,801,300 B2 *   8/2014   Arao ................ G02B 6/4477
                                                           385/77
2012/0243832 A1  9/2012  Tamekuni et al.

FOREIGN PATENT DOCUMENTS

JP    2011-118348 A    6/2011

* cited by examiner

*Primary Examiner* — John Bedtelyon
(74) *Attorney, Agent, or Firm* — Yokoi & Co., U.S.A.; Toshiyuki Yokoi

(57) ABSTRACT

The present invention provides an optical connector capable of fixing the tensile strength fibers of the optical cable to the optical connector while keeping the tensile strength sufficiently without sacrificing the easiness of assembling the optical connector. The optical connector The optical connector is configured to be attached to an optical cable having an optical fiber and tensile strength fibers extending along a longitudinal direction of the optical fiber, having: a connector body having a male screw; and a fixing member used for fixing the tensile strength fibers to the connector body, the fixing member having a female screw, wherein the tensile strength fibers are configured to be interposed between the male screw and the female screw and fixed to the connector body when the male screw formed on the connector body and the female screw formed on the fixing member are screwed with each other, and the male screw has a notch extending in a direction crossing a screw thread of the male screw.

10 Claims, 11 Drawing Sheets

OPTICAL CONNECTOR

CROSS-REFERENCES TO RELATED APPLICATIONS

This patent specification claims priority to U.S. Provisional Application Ser. No. 62/810,965, filed Feb. 27, 2019, the entire contents of which are incorporated by reference herein.

BACKGROUND OF THE INVENTION

1. Field of the Invention

The present invention relates to an optical connector attached to an optical cable.

2. Description of Related Art

When the optical connector is connected with the optical cable, the optical connector is connected to an optical fiber which is exposed by removing a jacket of the optical cable. In addition, tensile strength fibers which are exposed by removing the jacket of the optical cable is fixed to a connector body (housing). Thus, the optical cable is fixed to the optical connector.

Patent Document 1 discloses a method where a male screw formed on a connector body and a female screw formed on a fixing member are screwed with each other and the tensile strength fibers are interposed between the male screw and the female screw. Thus, the tensile strength fibers can be easily fixed to the optical connector without using a special tool.

[Patent Document 1] Japanese Patent Application Laid-Open No. 2011-118348

BRIEF SUMMARY OF THE INVENTION

In the fixing method where the tensile strength fibers are interposed between the male screw and the female screw to fix the tensile strength fibers, the tensile strength fibers may be rotated along the male screw or the female screw when the male screw and the female screw are screwed with each other. In such a case, the tensile strength fibers are fixed to the optical connector in a state that the tensile strength fibers are twisted from the root part toward the tip part. The above described situation is especially remarkable in an LC connector whose diameter is small and pitch of the screw is also small.

If the tensile strength fibers are fixed to the optical connector in a state that the tensile strength fibers are twisted, the tensile strength may not be kept sufficiently at the portion where the tensile strength fibers are fixed when a certain force is applied to the optical cable.

The present invention provides an optical connector capable of fixing the tensile strength fibers of the optical cable to the optical connector while keeping the tensile strength sufficiently without sacrificing the easiness of assembling the optical connector.

The present invention discloses the configuration of an optical connector configured to be attached to an optical cable having an optical fiber and tensile strength fibers extending along a longitudinal direction of the optical fiber, the optical connector having: a connector body having a male screw; and a fixing member used for fixing the tensile strength fibers to the connector body, the fixing member having a female screw, wherein the tensile strength fibers are configured to be interposed between the male screw and the female screw and fixed to the connector body when the male screw formed on the connector body and the female screw formed on the fixing member are screwed with each other, and the male screw has a notch extending in a direction crossing a screw thread of the male screw.

In the above described configuration, the notch can be formed along an axial direction of the male screw.

In the above described configuration, the notch can be formed from a front end to a rear end of the screw thread in an axial direction of the male screw.

In the above described configuration, a depth of the notch can be 5% to 20% with respect to a diameter of the male screw.

In the above described configuration, the notch can be formed at a plurality of positions in a circumferential direction of the male screw.

In the above described configuration, the notch can be formed at two positions which are positioned symmetrically with each other in a circumferential direction of the male screw with respect to a center in a radial direction of the male screw.

In the above described configuration, the notch can include a first wall surface and a second wall surface, the first wall surface can be located at an advancing side in the clockwise direction compared to the second wall surface when viewed from a rear end side of the optical connector, and the first wall surface can be inclined by −10° to +10° with respect to a line connecting between a center of the male screw in a radial direction and a point at which the first wall surface and the second wall surface intersect. In addition, the second wall surface can be inclined by 70° to 90° with respect to a line connecting between a center of the male screw in a radial direction and a point at which the first wall surface and the second wall surface intersect.

By using the optical connector of the present invention, since the notch is formed on the male screw, the rotation of the tensile strength fibers can be prevented when the tensile strength fibers are fixed. Accordingly, the tensile strength fibers of the optical cable can be fixed to the optical connector while keeping the tensile strength sufficiently without sacrificing the easiness of assembling the optical connector.

DETAILED DESCRIPTION OF THE INVENTION

Hereafter, the embodiments of the present invention will be explained with reference to illustratively shown drawings. An optical connector 1 of the present embodiment is a fusion splicing LC connector which is assembled to an optical cable 100 when it is used. When the optical cable 100 is assembled to the optical connector 1, the optical cable 100 can be processed into the state where the optical cable 100 can be easily connected with other optical connectors. An optical fiber 110 of the optical cable 100 is connected with a built-in optical fiber 11 of the optical connector 1, the connected portion is housed in the optical connector 1, and the optical cable 100 is fixed to the optical connector 1. Thus, the optical connector 1 is assembled with the optical cable 100.

Figure 1:
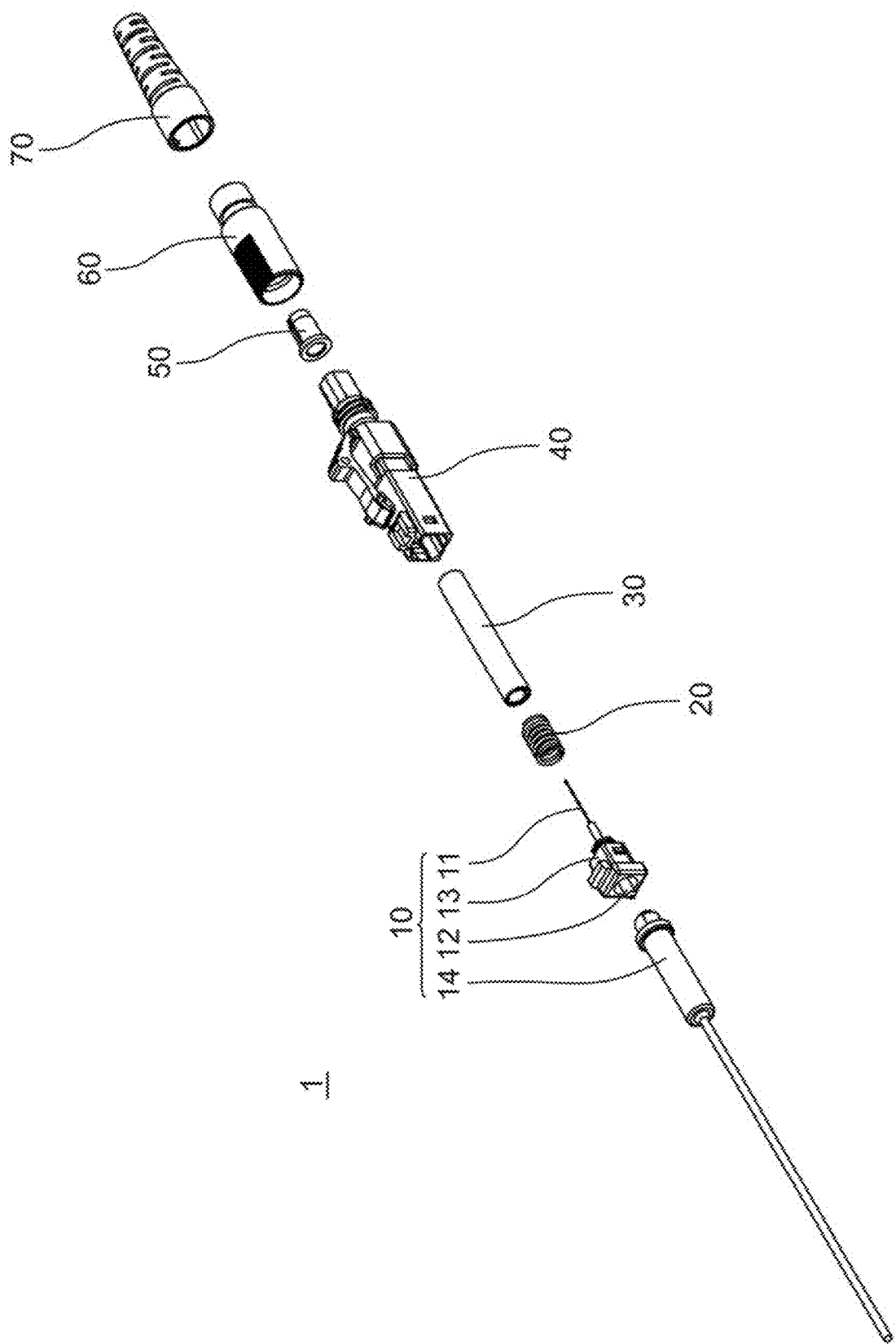
FIG. 1 is an exploded perspective view of an optical connector.
Figure 2:
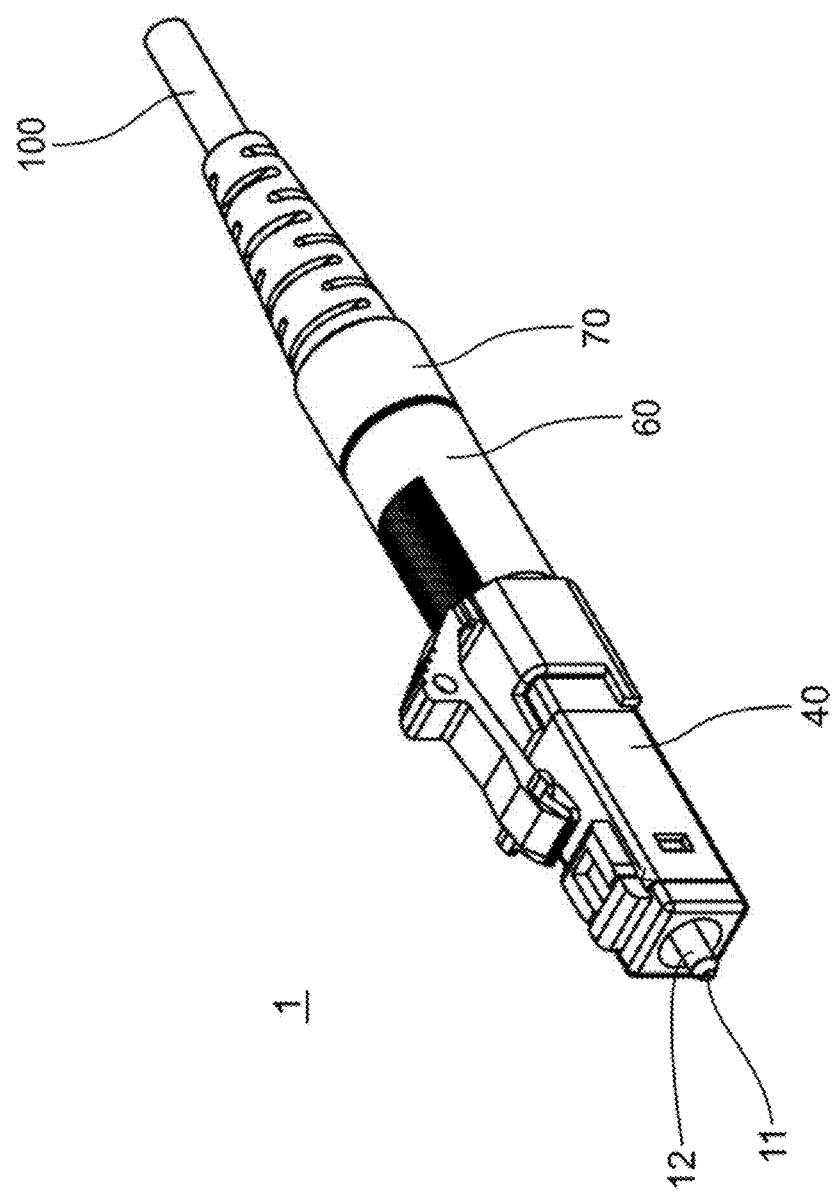
FIG. 2 is a perspective view of the optical connector in a state that the components are assembled.
Figure 3:
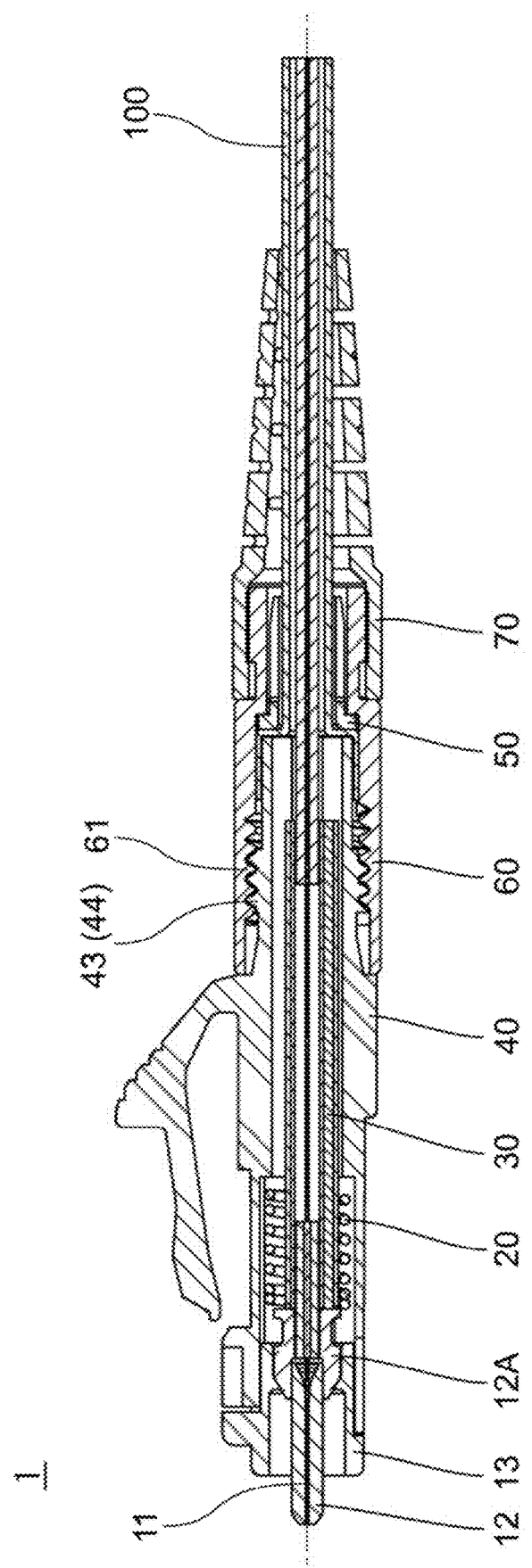
FIG. 3 is a cross-sectional view of the optical connector in a state that the components are assembled.

FIG. 1 is an exploded perspective view of the optical connector 1. FIG. 2 is a perspective view of the optical connector 1 in a state that the components are assembled. FIG. 3 is a cross-sectional view of the optical connector 1 in a state that the components are assembled. The optical connector 1 is formed by a plug unit 10, a spring 20, a fusion protection sleeve 30, a connector body (housing) 40, a clamp member 50, a fixing member 60 and a boot 70. The connector body 40 is a member for housing the connected portion of the optical cable. The clamp member 50 and the fixing member 60 are members for fixing the optical cable 100 to the connector body 40. In the following explanation, when viewed from the connector body 40, the plug unit 10 side is referred to as the front, and the fixing member 60 side is referred to as the rear.

The plug unit 10 arranged on the front end of the optical connector 1 is formed by a built-in optical fiber 11, a ferrule 12, a ferrule housing 13 and a protective cap 14. The plug unit 10 is a portion connected with the other optical connectors from the front side in a state that the protective cap 14 is removed.

The built-in optical fiber 11 is inserted into a cylindrical-shaped ferrule 12 in a state that the front end of the built-in optical fiber 11 is aligned with the front end of the ferrule 12, and the built-in optical fiber 11 is held by the ferrule 12. The rear end of the built-in optical fiber 11 is extended rearward from the ferrule 12 by a predetermined length. As explained later, the optical fiber 110 of the optical cable 100 is connected with the rear end of the built-in optical fiber 11 by fusion.

The front end of the ferrule 12 is a portion connected with the other optical connectors. Polishing or other processing is preliminarily applied to the front end of the ferrule 12. The ferrule 12 is inserted into the ferrule housing 13 having an approximately rectangular cross-section and fixed to the ferrule housing 13.

The front end of the ferrule 12 is covered with the protective cap 14. The protective cap 14 is detachable from the front end of the ferrule 12. When the optical connector 1 is connected with the other optical connectors, the protective cap 14 is removed from the ferrule 12.

The spring 20 is arranged on the rear side of the ferrule housing 13. When the ferrule housing 13 and the connector body 40 are fixed to each other, the spring 20 is sandwiched between the rear wall surface of a ferrule flange 12A and a front wall surface of the connector body 40 to energize the ferrule housing 13 frontward.

The fusion protection sleeve 30 is formed in a cylindrical shape. After the built-in optical fiber 11 and the optical fiber 110 are connected with each other by fusion, the outside of the connected portion is covered with the fusion protection sleeve 30 to protect the connected portion.

Figure 4:
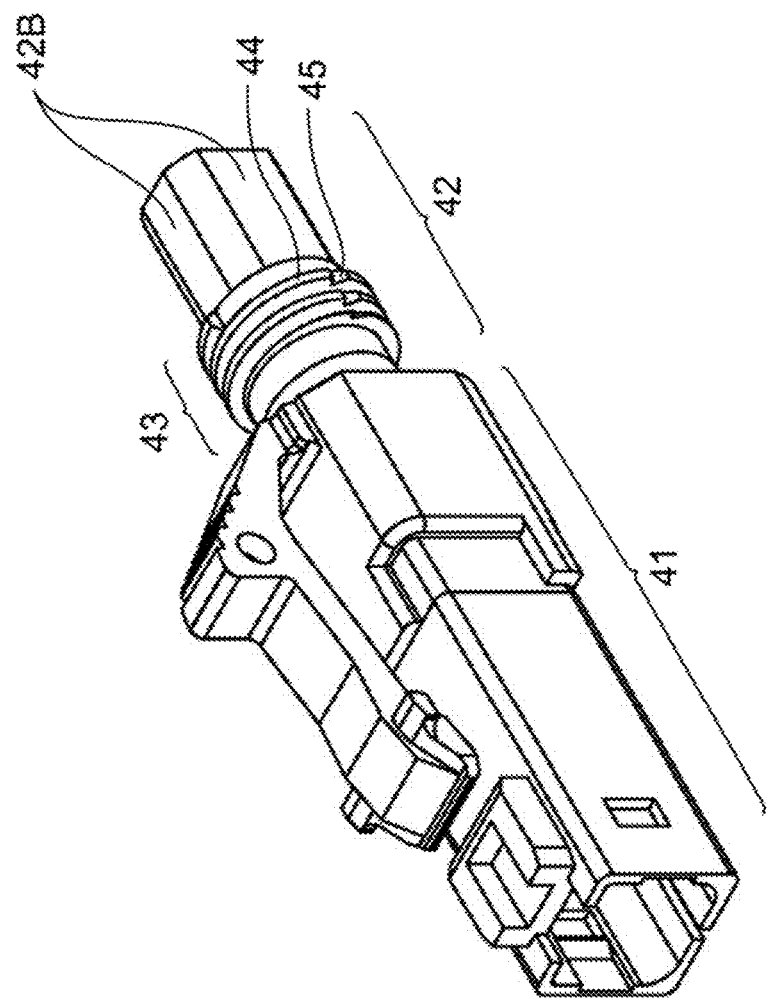
FIG. 4 is a perspective view showing an example of a connector body when viewed from the front.
Figure 5:
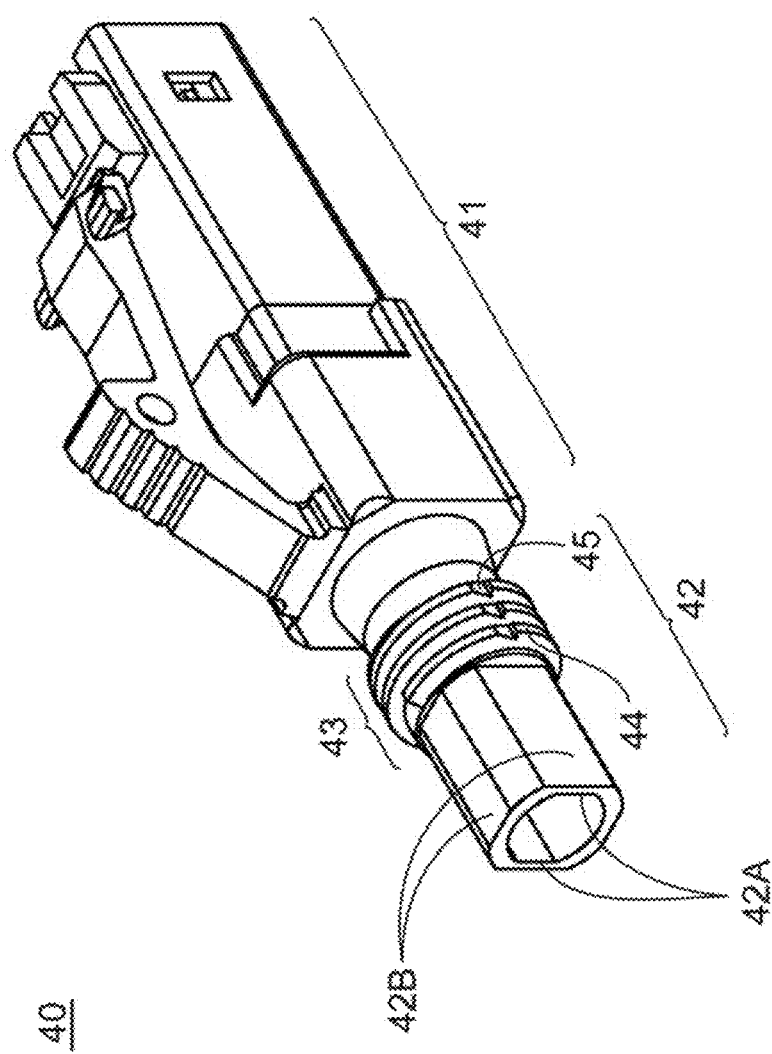
FIG. 5 is a perspective view of the connector body of FIG. 4 when viewed from the rear.

FIG. 4 is a perspective view showing an example of the connector body 40 when viewed from the front. FIG. 5 is a perspective view of the connector body 40 of FIG. 4 when viewed from the rear. The connector body 40 houses the built-in optical fiber 11 and the optical fiber 110 inside in a state that they are connected with each other. In addition, tensile strength fibers 130 of the optical cable 100 are fixed to the connector body 40. The connector body 40 has a fiber connection portion 41 having an approximately rectangular cross-section at the front side, and a cable fixing portion 42 having a circular cross-section at the rear side.

The fiber connection portion 41 is formed in a rectangular cylindrical shape along the axial direction of the connector body 40 from the front end of the connector body 40. The inner shape of an opening located at the front end of the fiber connection portion 41 is formed in an approximately rectangular cross-section which is an approximately same shape as the outer shape of the ferrule housing 13. The ferrule housing 13 can be inserted into the opening located at the front end of the fiber connection portion 41 from the front side.

The cable fixing portion 42 is formed in a circular cylindrical shape along the axial direction of the connector body 40 from the rear end of the connector body 40. As shown in FIG. 3, the inside of the cable fixing portion 42 is communicated with the inside of the fiber connection portion 41. As shown in FIG. 5, although the inner shape of the cable fixing portion 42 is formed in an approximately circular cross-section, flat surface portions 42A are formed at both left and right sides by cutting a part of the circular cross-sectional shape in a vertical direction. Although the outer shape of the cable fixing portion 42 is formed in an approximately circular cross-section, flat surface portions 42B are formed at both upper and lower sides and at both left and right sides by cutting a part of the circular cross-sectional shape in a horizontal direction and a vertical direction respectively. Therefore, after the assembling of the optical connector 1 is completed, clearance is formed between the fixing member 60 and the flat surface portions 42B located at the outside of the cable fixing portion 42. Thus, the tensile strength fibers 130 are mainly arranged in the clearance located at both left and right sides, and a jacket 140 is mainly arranged in the clearance located at both upper and lower sides.

A male screw 43 is formed on an outer periphery of the cable fixing portion 42 located at the rear end (rear portion) of the connector body 40. A screw thread 44 of the male screw 43 can be formed from the rear end of the connector body 40 as a start position. However, it is not necessary to form the screw thread 44 from the rear end as the start position. In the present embodiment, as shown in FIG. 5, the male screw 43 is formed from the position located frontward by a predetermined distance from the rear end of the connector body 40. The male screw 43 can be screwed with the later described female screw 61 of the fixing member 60. When the male screw 43 and the female screw 61 are screwed with each other, the tensile strength fibers 130 of the optical cable 100 are interposed (sandwiched) between the male screw 43 and the female screw 61. Thus, the optical cable 100 is fixed to the connector body 40. Note that a part of the jacket 140 can be also interposed between the male screw 43 and the female screw 61 together with the tensile strength fibers 130.

As shown in FIGS. 4 and 5, a notch (groove) 45 is formed on the screw thread 44 of the male screw 43 at a plurality of positions (left side and right side when viewed from the rear) in a circumferential direction of the male screw 43. In other words, a recess is partly formed on the screw thread 44 of the male screw 43. It can be also said that the screw thread 44 is partly or intermittently formed. Specifically, the notch 45 is formed at two positions which are located symmetrically to each other in the circumferential direction of the male screw 43 with respect to the center in the radial direction of the male screw 43. The positions of forming the notch 45 are coincident with the positions of the plane surface portions 42B formed on the cable fixing portion 42 in the circumferential direction of the male screw 43. The longitudinal direction of the notch 45 is formed (aligned) along an axial direction of the male screw 43. Namely, the notch 45 is formed in the direction approximately perpendicular to the screw thread 44. In addition, the notch 45 is formed from the front end to the rear end of the screw thread 44 in the axial direction of the male screw 43. Namely, the notch 45 is formed over a whole (overall) length of the screw thread 44 in the axial direction of the male screw 43. Since the notch 45 is formed, the tensile strength fibers 130 of the optical cable 100 can be inserted into the notch 45 when the male screw 43 is screwed with the female screw 61. Because of this, the tensile strength fibers 130 can be prevented from rotating in the circumferential direction of the screw thread 44. The shape and effect of the notch 45 will be explained later in detail.

Figure 6:
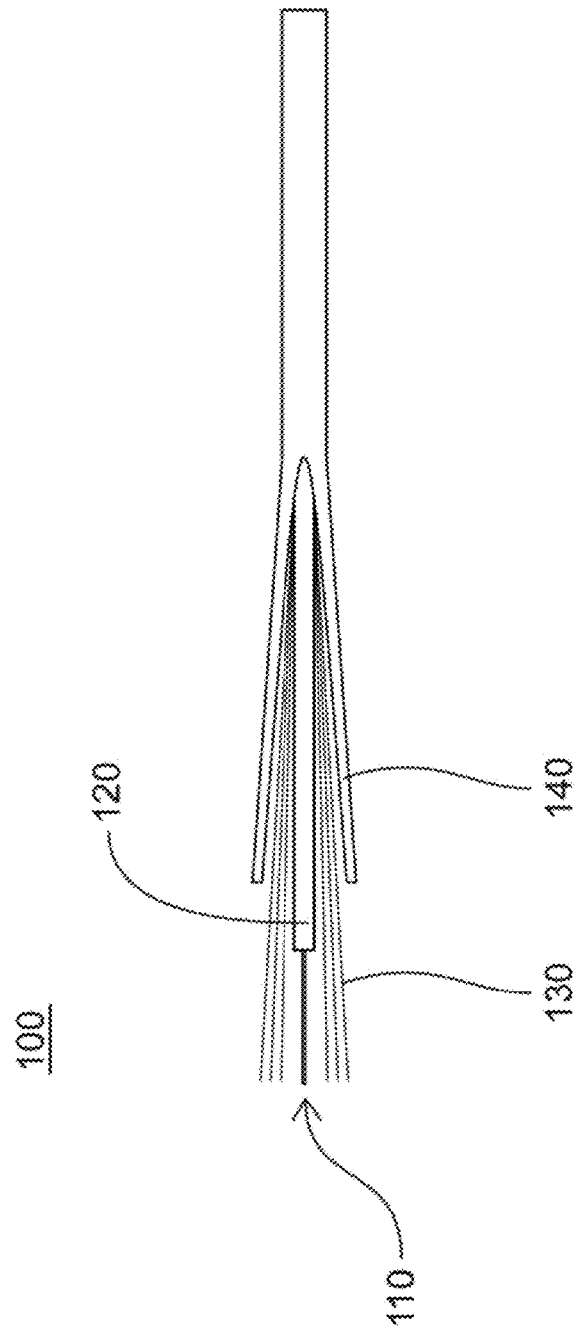
FIG. 6 is a drawing showing a tip of an optical cable.

FIG. 6 shows a tip part of the optical cable 100. The optical cable 100 has an optical fiber 110, a protection member 120 which covers the periphery of the optical fiber 110, a jacket 140 which covers the outermost periphery of the optical cable 100, and tensile strength fibers 130 which are inserted between the protection member 120 and the jacket 140. The protection member 120, the tensile strength fibers 130 and the jacket 140 are concentrically formed on the periphery of the optical cable 100 and extending along the longitudinal direction of the optical fiber 100. As shown in FIG. 6, when the jacket 140 is cut and torn over a predetermined length from the front end of the optical cable 100, the tensile strength fibers 130 are exposed from the inside of the jacket 140, and the optical fiber 110 covered with the protection member 120 is exposed from the inside of the tensile strength fibers 130. In addition, when the protection member 120 is cut and removed, the optical fiber 110 is exposed from the inside of the protection member 120. The tensile strength fibers 130 are formed by assembling a plurality of fibers with an extra fine diameter such as Kevlar (registered trademark).

As shown in FIGS. 1 and 3, the clamp member 50 is arranged on the rearward of the connector body 40. The clamp member 50 has an approximately circular cylindrical shape. A flange portion projected outward is formed on the front end of the clamp member 50 in the entire circumferential direction. The clamp member 50 is preliminarily inserted to the optical cable 100, and the clamp member 50 is moved frontward after the optical cable 100 is housed in the cable fixing portion 42 of the connector body 40. As a result, the tensile strength fibers 130 and the jacket 140 of the optical cable 100 are arranged on the periphery of the cable fixing portion 42. At this time, the flange portion of the clamp member 50 sandwiches the jacket 140 with the rear end surface of the connector body 40 between them. Thus, the flange portion has an effect of fixing the optical cable 100 to the connector body 40.

As shown in FIG. 3, the fixing member 60 is a member used for fixing the tensile strength fibers 130 of the optical cable 100 to the cable fixing portion 42 of the connector body 40. The fixing member 60 is formed in an approximately circular cylindrical shape. The fixing member 60 is inserted to the outside of the cable fixing portion 42 and the clamp member 50 from the rearward of the clamp member 50. The female screw 61 is formed on an inner peripheral surface of an opening located at the front side of the fixing member 60. The female screw 61 can be screwed with the male screw 43 of the connector body 40. When the male screw 43 is screwed with the female screw 61, the tensile strength fibers 130 of the optical cable 100 are interposed between the male screw 43 and the female screw 61. Thus, the optical cable 100 is fixed to the connector body 40. A predetermined clearance is formed between the male screw 43 and the female screw 61 so that the tensile strength fibers 130 can be interposed between the male screw 43 and the female screw 61.

As shown in FIGS. 1, 2 and 3, the boot 70 is fitted to the outside of the rear end of the fixing member 60 from the rearward of the fixing member 60. The boot 70 protects the optical cable 100 to prevent the optical cable 100 from being rapidly bent at the rear end portion of the optical connector 1.

Figure 7:
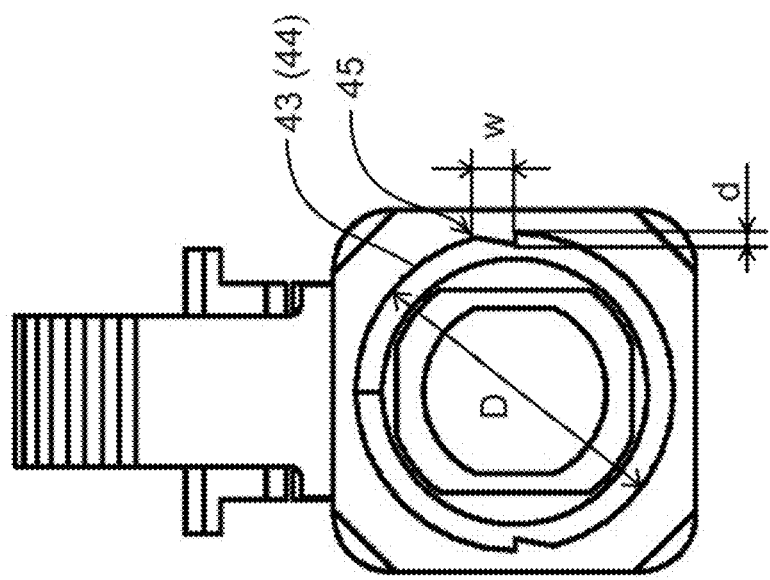
FIG. 7 is a drawing of the connector body when viewed from the rear side (male screw side).

FIG. 7 is a drawing of the connector body 40 when viewed from the male screw side (rear side). With reference to FIG. 7, the dimension of the notch 45 of the male screw 43 will be explained. The width w of the notch 45 is preferably formed within a range of approximately 0.1 mm to 0.5 mm. The width w means a distance between the start point and the end point of the notch 45 on a circumference of the screw thread 44 of the male screw 43. The ratio w/D of the width w of the male screw 43 with respect to the diameter D is preferably 0.02 to 0.1 (2% to 10%). If the ratio w/D is less than 2%, the amount of the tensile strength fibers 130 to be inserted into the notch 45 is too small and such a situation is not preferable. If the ratio w/D exceeds 10%, the force of tightening the tensile strength fibers 130 sandwiched by the male screw 43 and the female screw 61 is too small and such a situation is not preferable.

The appropriate value of the depth d of the notch 45 varies depending on the diameter D of the male screw 43. The depth d means the distance from the circumference of the screw thread 44 of the male screw 43 to the position where the notch 45 reaches (becomes) the deepest position in the radial direction. The ratio d/D of the depth of the notch 45 with respect to the diameter D of the male screw 43 is preferably 0.05 to 0.2 (5% to 20%). If the ratio d/D is less than 5%, the amount of the tensile strength fibers 130 to be inserted into the notch 45 is too small and such a situation is not preferable. If the ratio d/D exceeds 20%, the force of tightening the tensile strength fibers 130 sandwiched by the male screw 43 and the female screw 61 is too small and such a situation is not preferable.

Figure 8:
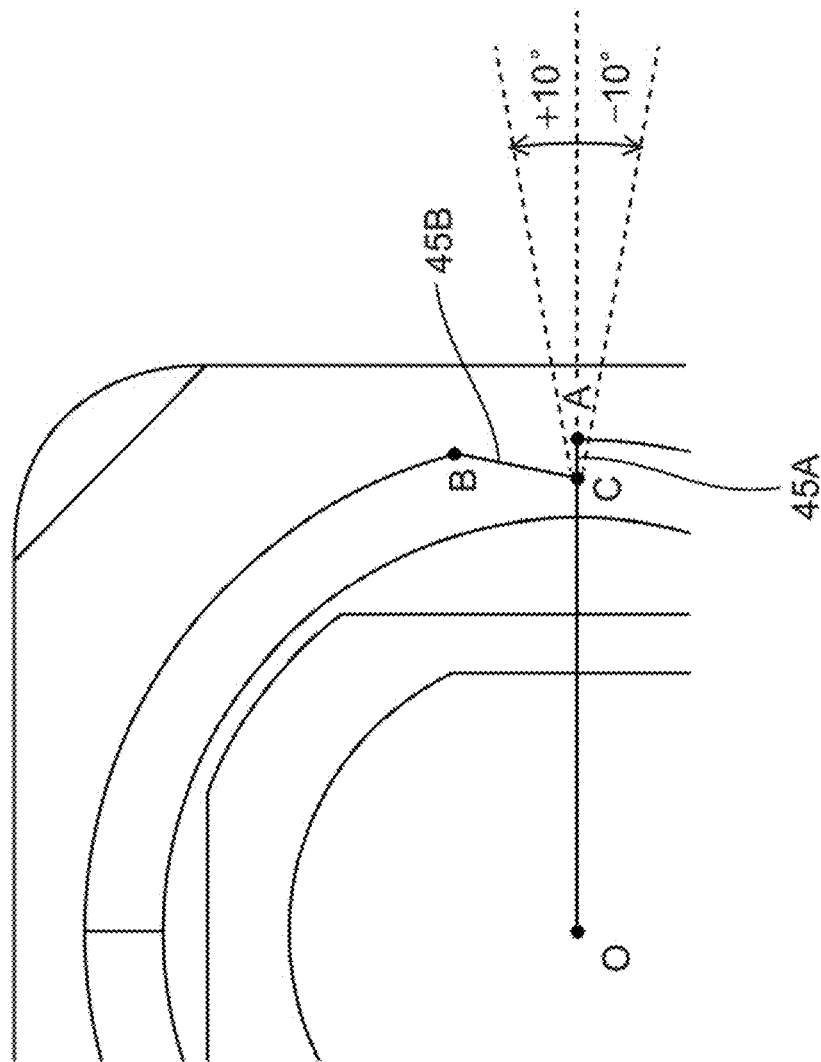
FIG. 8 is an enlarged drawing of FIG. 7 for showing an inclination of a wall surface of the notch.
Figure 9:
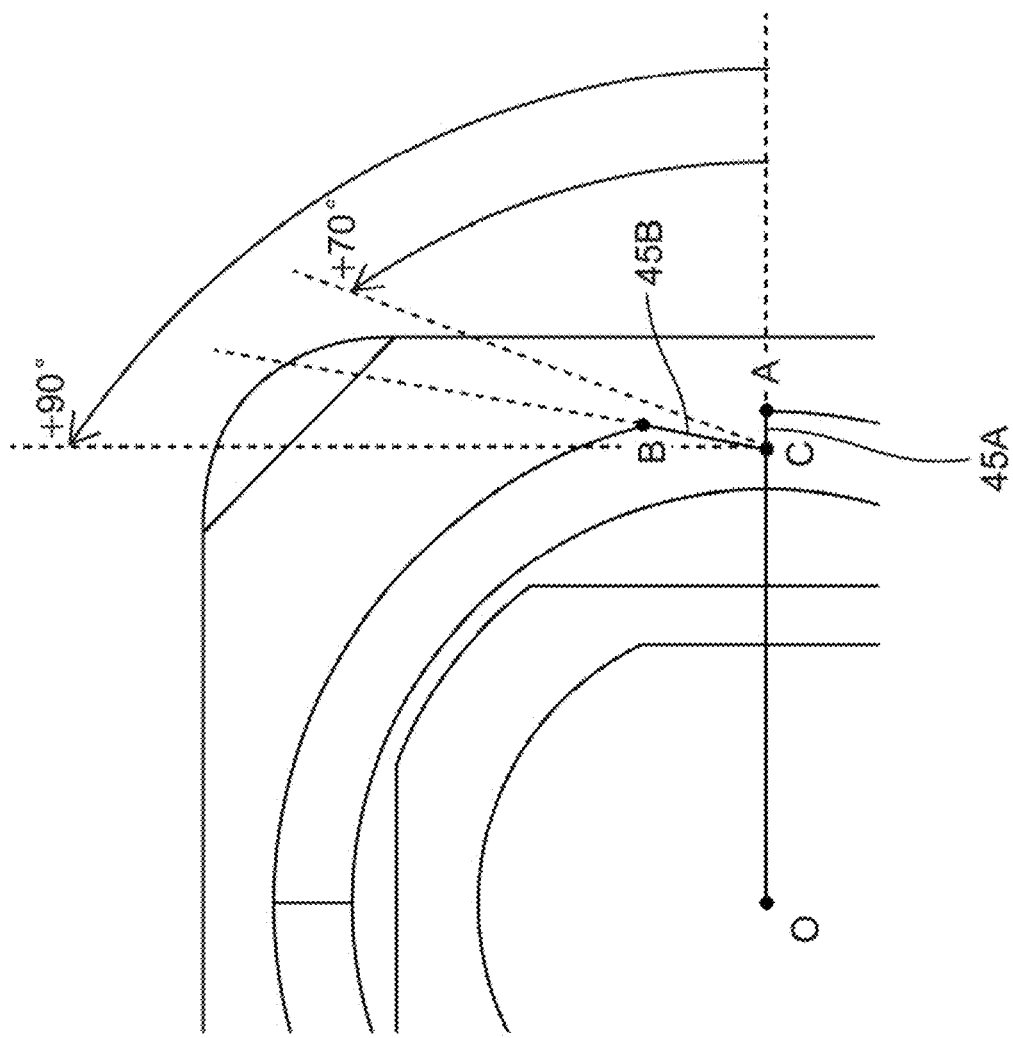
FIG. 9 is an enlarged drawing of FIG. 7 for showing an inclination of a wall surface of the notch.

Same as FIG. 7, FIGS. 8 and 9 are drawings of the connector body 40 when viewed from the rear side (male screw side). With reference to FIGS. 8 and 9, the inclination of the wall surface of the notch 45 will be explained. The notch 45 is formed by a first wall surface 45A and a second wall surface 45B. When viewed from the rear end side of the optical connector 1 (connector body 40), the wall surface located at an advancing side in the clockwise direction is defined as the first wall surface 45A, and the wall surface located at an opposite side to the advancing side in the clockwise direction is defined as the second wall surface 45B. In other words, the first wall surface 45A is located at the advancing side of the rotation direction of the fixing member 60 when the female screw 61 of the fixing member 60 is screwed with the male screw 43 of the connector body 40 from the rear end side of the connector body 40, while the second wall surface 45B is located at the opposite side of the first wall surface 45A to face the first wall surface 45A.

With reference to FIG. 8, the inclination of the first wall surface 45A will be explained. The reference line is a straight line OC connecting between a center point O of the male screw 43 in the radial direction and a point C at which the first wall surface 45A and the second wall surface 45B intersect. The inclination of the first wall surface 45A is determined based on a straight line CA connecting between the above described point C and a point A located on the outer periphery of the male screw 43 of the first wall surface 45A (point where the first wall surface 45A intersects with the outer periphery of the male screw 43). The straight line CA is preferably inclined 0° to +10° with respect to the line OC (or the extended line of the line OC). Namely, the first wall surface 45A can be inclined by −10° to +10° with respect to the line OC connecting between the center O of the male screw 43 in a radial direction and the point C at which the first wall surface 45A and the second wall surface 45B intersect. Here, the inclination angle is defined with the anti-clockwise direction as a positive when the optical connector 1 is viewed from the male screw side (rear side).

With reference to FIG. 9, the inclination angle of the second wall surface 45B will be explained. The reference line is the line OC same as the above. The inclination of the second wall surface 45B is determined based on a straight line CB connecting between the above described point C and a point B located on the outer periphery of the male screw 43 of the second wall surface 45B (point where second wall surface 45B intersects with the outer periphery of the male screw 43). The straight line CB is preferably inclined +70° to +90° with respect to the line OC (or the extended line of the line OC). Namely, the second wall surface 45B is preferably inclined by +70° to +90° with respect to the line OC connecting between the center O of the male screw 43 in a radial direction and the point C at which the first wall surface 45A and the second wall surface 45B intersect. Here, the inclination angle is defined with the anti-clockwise direction as a positive when the optical connector 1 is viewed from the male screw side (rear side).

It can be also said that the inclination angle of the second wall surface 45B is preferably larger than the inclination angle of the first wall surface 45A with respect to the straight line OC. This is because the first wall surface 45A serves as the side of receiving the force and receiving the tensile strength fibers 130 interposed between the female screw 61 and the male screw 43. In order to prevent the tensile strength fibers 130 from coming out from the notch 45, the first wall surface 45A is preferably inclined at a nearly a right angle with respect to the force received from the fixing member 60 (the angle nearly 0° with respect to the straight line OC). On the other hand, in order to insert a large amount of tensile strength fibers 130 in the notch 45, the second wall surface 45B is preferably inclined +70° or more. However, if the inclination exceeds +90°, the effect of providing the notch 45 is reduced and such a situation is not preferable.

Hereafter, the process of connecting the optical fiber 110 of the optical cable 100 and the built-in optical fiber 11 of the optical connector 1 with each other and the process of assembling the optical connector 1 with the optical cable 100 will be explained.

First, the boot 70, the fixing member 60, the clamp member 50, the connector body 40, the fusion protection sleeve 30 and the spring 20 are inserted to the outside of the optical cable 100 from the rear end side to the front end side in this order. Note that the clamp member 50, the connector body 40, the fusion protection sleeve 30, the spring 20 and other components can be temporarily assembled to the connector body 40 and the fixing member 60 in advance.

The jacket 140 is cut and torn into two from the front end side of the optical cable 100 over a predetermined length. As a result, the tensile strength fibers 130 is exposed from the jacket 140. Furthermore, the torn jacket 140 and tensile strength fibers 130 are folded rearward to expose the optical fiber 110 covered with the protection member 120. Furthermore, the protection member 120 is cut and removed by a predetermined length from the front end side of the optical cable 100 to expose the optical fiber 110 from the protection member 120.

The front end of the optical fiber 110 of the optical cable 100 and the rear end of the built-in optical fiber 11 of the plug unit 10 are fused and fixed to each other by a fusing machine. Then, the fusion protection sleeve 30 is moved forward and covered on the outside of the optical fiber 110 and the built-in optical fiber 11. Then, the jacket 140 and the tensile strength fibers 130 are returned to the original state from the folded state.

Figure 10:
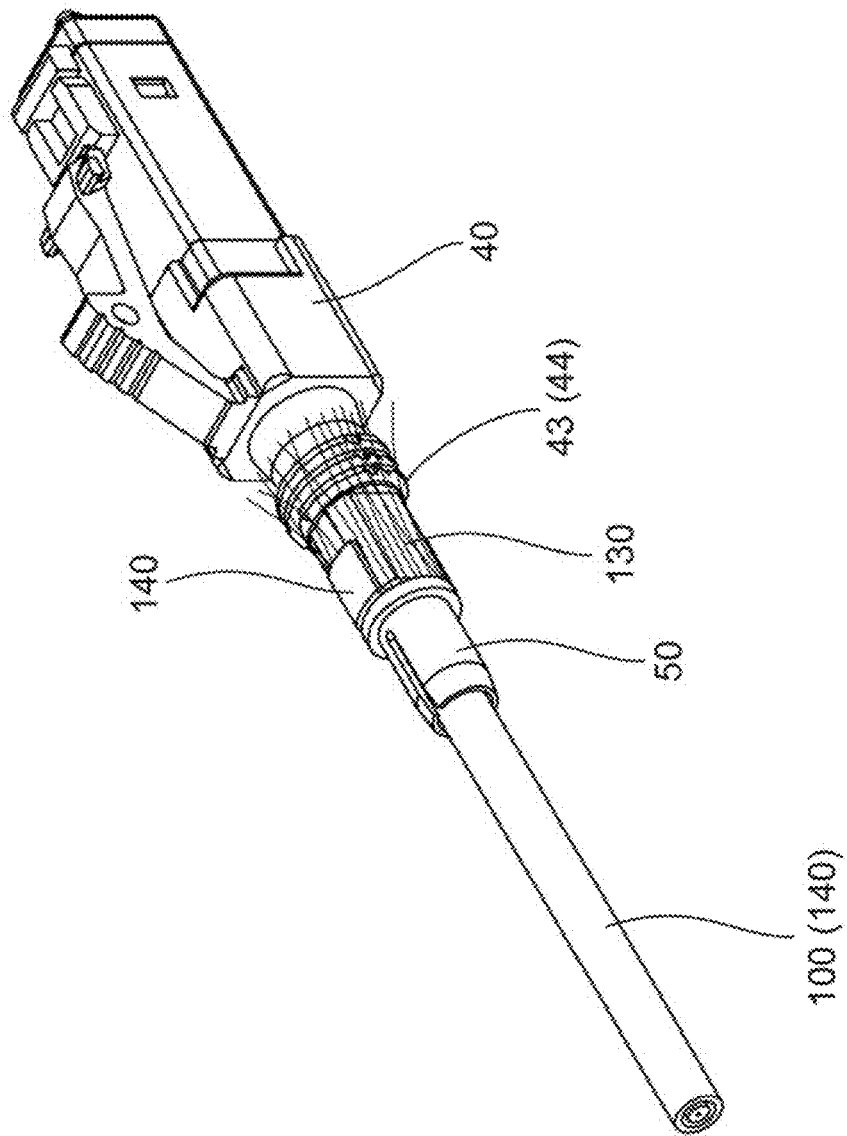
FIG. 10 is a drawing showing the state that the male screw is covered with the tensile strength fibers.

Then, the spring 20 and the connector body 40 are moved forward and inserted. Consequently, the connector body 40 and the plug unit 10 are connected and fixed to each other. In this state, the jacket 140 of the optical cable 100 covers the outside of the cable fixing portion 42 located on the connector body 40 at the rear side. When the clamp member 50 is moved forward, the tensile strength fibers 130 and the jacket 140 are pushed forward by the clamp member 50 as shown in FIG. 10. Consequently, the tensile strength fibers 130 is arranged near the outer periphery of the male screw 43 of the connector body 40.

Figure 11:
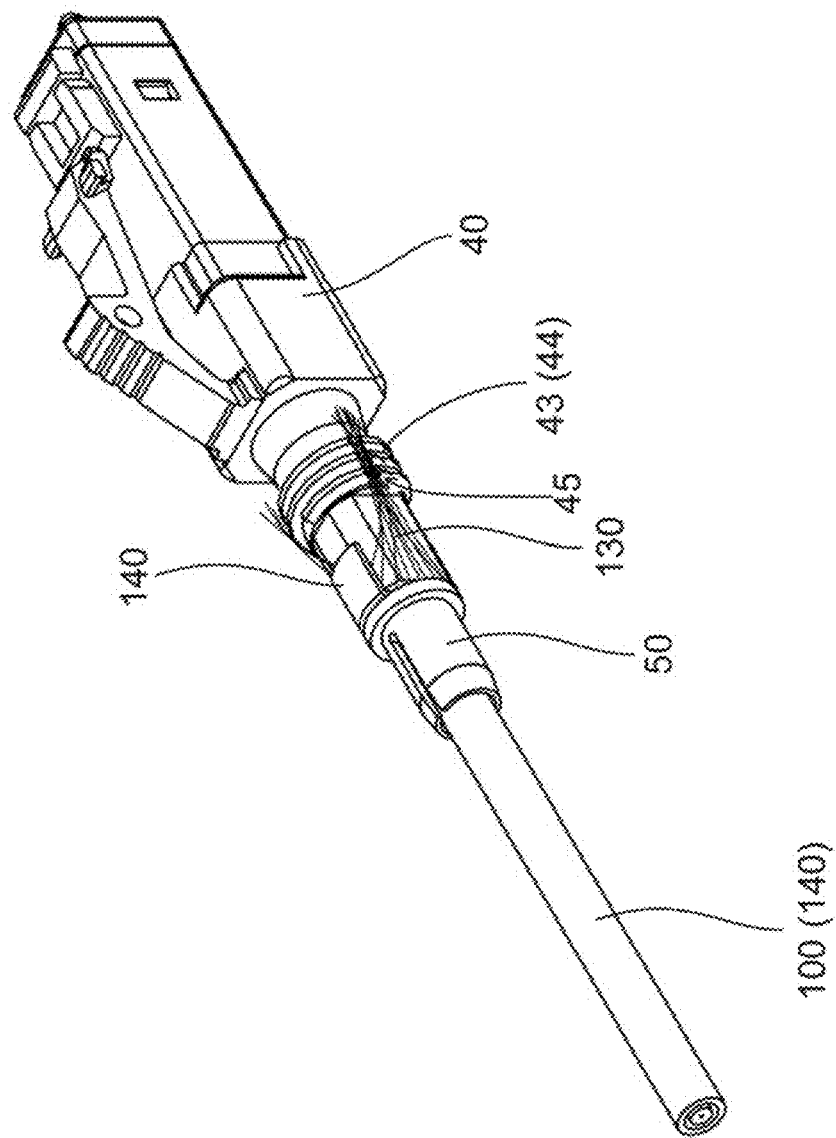
FIG. 11 is a drawing showing the state that the tensile strength fibers are inserted into the notch of the male screw.

Then, the fixing member 60 is moved forward, and the female screw 61 of the fixing member 60 is screwed with the male screw 43 of the connector body 40. As a result, the tensile strength fibers 130 arranged near the outer periphery of the male screw 43 are interposed between the male screw 43 and the female screw 61 and fixed. At this time, since the notch 45 is provided on the male screw 43, the tensile strength fibers 130 can be inserted into the clearance of the notch 45. Consequently, the tensile strength fibers 130 can be prevented from rotating in the circumferential direction of the screw thread 44 when the male screw 43 and the female screw 61 are screwed with each other. Although FIG. 11 is a drawing showing the state after the fixing member 60 is assembled with the connector body 40, the illustration of the fixing member 60 is omitted for showing the state of the tensile strength fibers 130. Note that the state where the tensile strength fibers 130 are inserted into the notch 45 is included in the state where the tensile strength fibers 130 are interposed between the male screw 43 and the female screw 61.

Finally, the boot 70 is fitted to the outside of the rear end of the fixing member 60. The assembling of the optical connector 1 to the optical cable 100 is finished by the above described procedures.

Hereafter, the effects of forming the notch 45 on the male screw 43 of the connector body 40 will be explained. FIG. 10 is a drawing showing the state that the male screw 43 is covered with the tensile strength fibers 130. FIG. 11 is a drawing showing the state that the tensile strength fibers 130 are inserted into the notch 45 of the male screw 43.

In a state that the optical fiber 110 and the built-in optical fiber 11 are fixed with each other and then the clamp member 50 is moved forward, the tensile strength fibers 130 are arranged on the outer periphery of the male screw 43 as shown in FIG. 10. After that, during the process of screwing the female screw 61 of the fixing member 60 with the male screw 43 of the connector body 40, the tip end side of the tensile strength fibers 130 is rotated in the same direction as the rotation direction of the female screw 61 by the friction with the female screw 61. However, since the notch 45 is formed on the male screw 4, the tensile strength fibers 130 are inserted (entered) into the notch 45 as shown in FIG. 11. Thus, the tensile strength fibers 130 are prevented from rotating in the rotation direction of the female screw 61 beyond the position of the notch 45. Namely, further rotation of the tensile strength fibers 130 is prevented when the tensile strength fibers 130 are in contact with the wall surface 45A. Even when the male screw 43 and the female screw 61 are further screwed with each other, the position of the tensile strength fibers 130 is maintained. Thus, the tensile strength fibers 130 are surely fixed to the connector body 40 at the position between the male screw 43 and the female screw 61. When the notch 45 is not formed, the tensile strength fibers 130 may be fixed to the connector body 40 in a state that the tensile strength fibers 130 are further rotated in a state that the tensile strength fibers are twisted from the root part toward the tip part.

The experiment for comparing the tensile strength was performed between the case of forming the notch 45 on the male screw 43 and the case of not forming the notch 45 by pulling the optical connector 1 and the optical cable 100 after the optical connector 1 and the optical cable 100 are assembled. The force of causing the disconnection of the tensile strength fibers 130 is defined as the tensile strength and the results are shown in Table 1.

TABLE 1

| No. | Tensile strength without notch [N] | Tensile strength with notch [N] |
| --- | --- | --- |
| 1 | 52.7 | 105.9 |
| 2 | 100.4 | 115.1 |
| 3 | 95.9 | 101.7 |
| 4 | 101.6 | 99.9 |
| 5 | 99.9 | 98.9 |
| 6 | 118.0 | 121.5 |
| 7 | 87.8 | 104.7 |
| 8 | 62.5 | 111.2 |
| 9 | 81.4 | 95.8 |
| 10 | 96.3 | 110.4 |
| Maximum | 118.0 | 121.5 |
| Minimum | 52.7 | 95.8 |
| Average | 89.7 | 106.5 |
| Deviation | 19.51 | 8.02 |

From the results shown in Table 1, it can be understood that the average value of the tensile strength was increased and the tensile strength was totally increased by forming the notch 45. In addition, it can be understood that the deviation was reduced remarkably and the individual difference of the tensile strength was reduced. Namely, when the notch 45 is formed on the male screw 43, the disconnection of the tensile strength fibers 130 can be suppressed.

In the above described embodiments, the LC connector is used as an example. However, the present invention can be also applied to the optical connectors other than the LC connector. The present invention is effective for all optical connectors which adopts the structure where the tensile strength fibers are interposed between the male screw and the female screw.

In the above described embodiments, the notch 45 is formed at two positions which are positioned symmetrically with each other in the circumferential direction of the male screw 43 with respect to the center in the radial direction of the male screw 43. However, it is not necessary to symmetrically locate the two positions of the notch 45. In addition, the number of the notch 45 is not necessarily two. For example, the notch 45 can be formed only at one position or at a plurality of positions (three positions or more) in the circumferential direction of the male screw 43. When the notch 45 is formed at a plurality of positions, the intervals between the notches 45 can be constant.

In the above described embodiments, the notch 45 is formed along the axial direction of the male screw 43. However, the notch 45 is not necessarily directed along the axial direction of the male screw 43. The effect of the present invention can be exhibited as long as the notch 45 is extending in the direction crossing the screw thread 44.

In the above described embodiments, the notch 45 is formed from the front end to the rear end of the screw thread 44 in the axial direction of the male screw 43. However, it is not necessary to form the notch 45 from the front end to the rear end over the whole length in the axial direction. The effect of the present invention can be exhibited even when the notch 45 is formed only a part in the axial direction.

In the above described embodiments, the notch 45 is formed by the first wall surface 45A and the second wall surface 45B. However, the shape of the notch 45 is not limited to the above described shape. The notch 45 can be formed by one continuing wall surface or a combination of three or more wall surfaces. In addition, the shape of the first wall surface 45A and the second wall surface 45B is not limited to the linear shape. A part or the whole of the wall surface can be curved. It is also possible to form a protrusion or a recess on a part of the wall surface.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

DESCRIPTION OF THE REFERENCE NUMERALS

1: optical connector, 10: plug unit, 11: built-in optical fiber, 12: ferrule, 13: ferrule housing, 14: protective cap, 20: spring, 30: fusion protection sleeve, 40: connector body, 41: fiber connection portion, 42: cable fixing portion, 43: male screw, 44: screw thread, 45: notch, 50: clamp member, 60: fixing member, 61: female screw, 70: boot, 100: optical cable, 110: optical fiber, 120: protection member, 130: tensile strength fibers, 140: jacket

What is claimed is:

1. An optical connector configured to be attached to an optical cable having an optical fiber and tensile strength fibers extending along a longitudinal direction of the optical fiber, comprising:
a connector body having a male screw; and
a fixing member used for fixing the tensile strength fibers to the connector body, the fixing member having a female screw, wherein
the tensile strength fibers are configured to be interposed between the male screw and the female screw and fixed to the connector body when the male screw formed on the connector body and the female screw formed on the fixing member are screwed with each other,
the male screw has a notch extending in a direction crossing a screw thread of the male screw,
the notch includes a first wall surface and a second wall surface,
the first wall surface is located at an advancing side in the clockwise direction compared to the second wall surface when viewed from a rear end side of the optical connector, and
an inclination angle of the second wall surface is larger than an inclination angle of the first wall surface.

2. The optical connector according to claim 1, wherein the notch is formed along an axial direction of the male screw.

3. The optical connector according to claim 1, wherein the notch is formed from a front end to a rear end of the screw thread in an axial direction of the male screw.

4. The optical connector according to claim 1, wherein a depth of the notch is 5% to 20% with respect to a diameter of the male screw.

5. The optical connector according to claim 1, wherein the notch is formed at a plurality of positions in a circumferential direction of the male screw.

6. The optical connector according to claim 1, wherein the notch is formed at two positions which are positioned symmetrically with each other in a circumferential direction of the male screw with respect to a center in a radial direction of the male screw.

7. The optical connector according to claim 1, wherein the first wall surface is inclined by −10° to +10° with respect to a line connecting between a center of the male screw in a radial direction and a point at which the first wall surface and the second wall surface intersect.

8. The optical connector according to claim 1, wherein the second wall surface is inclined by 70° to 90° with respect to a line connecting between a center of the male screw in a radial direction and a point at which the first wall surface and the second wall surface intersect.

9. The optical connector according to claim 1, wherein a flat surface portion is formed on the connector body so that a clearance is formed between the fixing member and the flat surface portion when viewed from the rear end side of the optical connector.

10. The optical connector according to claim 9, wherein a position of forming the notch is coincident with a position of the flat surface portion in a circumferential direction of the male screw.

* * * * *